Dec. 6, 1938.    F. L. MYERS    2,138,874
FILTER UNIT
Filed March 5, 1936
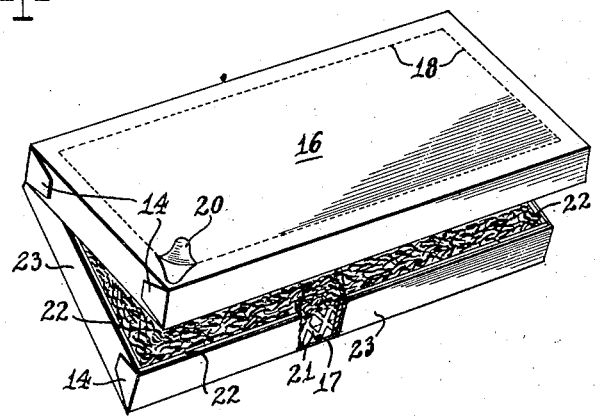
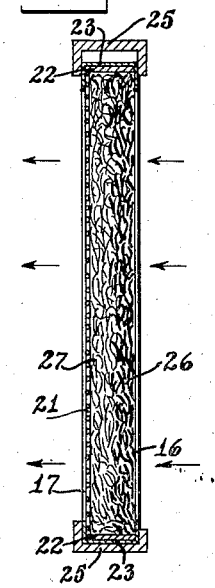
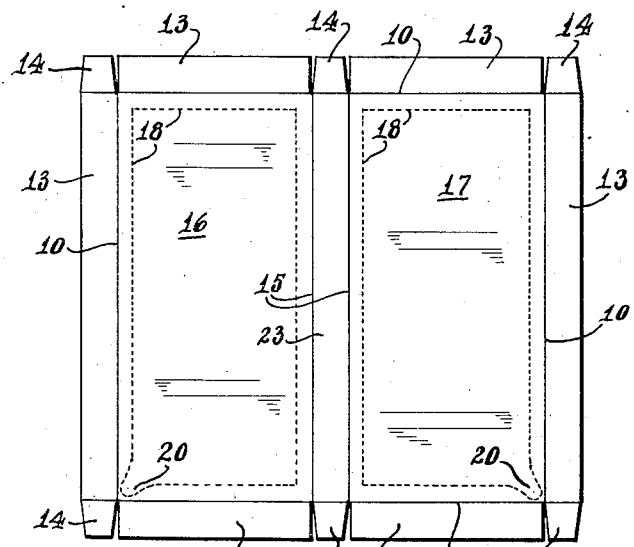
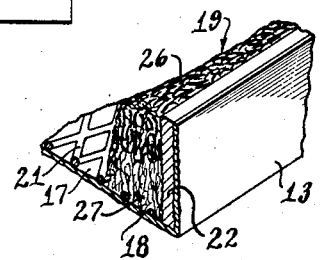
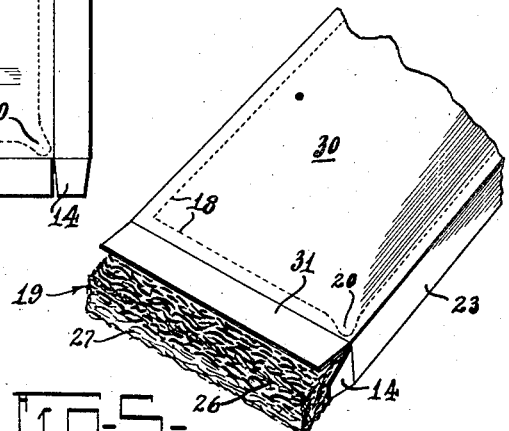
INVENTOR.
Frank L. Myers,
BY
Rule & Hoge ATTORNEYS.

Patented Dec. 6, 1938

2,138,874

UNITED STATES PATENT OFFICE 2,138,874

FILTER UNIT

Frank L. Myers, Newark, Ohio, assignor to Owens-Illinois Glass Company, a corporation of Ohio Application March 5, 1936, Serial No. 67,330

4 Claims. (Cl. 183—45)

The present invention relates to filter units and more particularly to a novel envelope or holder therefor.

In the use of filter units for filtering large quantities of gases, it is customary to provide an open frame for holding a filtering medium such as a mass of fibers or the like so that they may be inserted and held in a conventional filter framework. The fibers are coated with a tacky or cementitious substance adapted to stop and retain foreign particles of dirt, dust, etc., in the filtering gases. In order to protect these units before they are installed in place, it is necessary to keep them covered and protected from the surrounding atmosphere, gases, dirt and the like. Cartons of various types are conventionally used to prevent deterioration of the filtering units caused by subjection to the surrounding dirt and gases before installation. Thus, in the conventional filter unit, both a frame and an individual protective covering were required.

It is an object of the present invention to provide an envelope for a filter unit which serves a dual function in that it serves as a carton or container for protecting the filtering medium from deleterious effects of the surrounding atmosphere and dirt before it is ready for use and also as a frame for supporting and installing the filtering medium after portions of the envelope have been simply removed to expose the filtering medium and the unit installed for use.

It is another object of the present invention to provide a filter unit envelope which is inexpensive, simple and easy to construct.

It is also an object of the present invention to provide an envelope for a filter unit which is all in one piece, which is strong, and which may protect the filtering medium within the envelope from the atmosphere until the filter unit is to be installed.

Other objects and advantages will become apparent from the following description taken in conjunction with the drawing in which:

Fig. 1 is a perspective view, partly in section, showing a preferred embodiment of the present invention, the envelope being shown partly open for the sake of clarity;

Fig. 2 is a side cross-section view of a filter unit installed in a conventional filter frame;

Fig. 3 is a plan view of an envelope blank before it has been folded;

Fig. 4 is a fragmentary perspective view, partly in section, of a portion of a filter unit, showing the reinforcing means; and Fig. 5 is a fragmentary perspective view showing an alternative method of inserting filtering means into my filter envelope.

In fabricating a filter unit, particularly a unit designed for relatively large air filters, in which filtering medium such as glass wool or the like is incorporated, it is highly desirable to provide a carton or envelope which may be easily shipped, handled and installed and which is simple and inexpensive in design. In addition, it is advantageous to protect the filtering medium within the carton or envelope from dirt or other foreign material to which the filter unit may be subjected before installation. In complying with these requirements, a filter unit fabricated in accordance with the present invention is ideally suited.

The envelope may be made from heavy wrapping paper, light cardboard or similar material. As shown in Fig. 3, a sheet of the paper is cut to size and scored along marginal lines 10 to permit the circumjacent portions 13 to be turned or bent in a manner to form three of the marginal sides 23 of the envelope and to form tabs 14, which serve to bind and hold together the sides 23 in upright arrangement. Two parallel score lines 15, extending transversely of the sheet, midway between its ends, form the front and back panels 16 and 17, respectively, and also an interjacent fourth marginal side 23 which is hinged between the said front and back panels. In addition to the score lines which define the edges, the sheet, before being folded diptychally, is provided with perforated lines 18, parallel with and a short distance inward from the edges of each of the panels 16 and 17. The tabs 14 are preferably cut away from all but one of their respective adjacent sides 13 so that when the sheet of paper is folded along the lines 15 and the marginal lines 10 to form the box-shaped envelope, each of these tabs may be bent at right angles to overlie its adjacent side 13 to which it is fastened by suitable means such as glue, staples or the like. In providing the perforated or weakened lines 18, in the panels, it is desirable to incorporate a panel tab 20 to facilitate removal of the enclosed perforated sections of the panels 16 and 17, the purpose of which will be described more fully hereinafter.

Preferably before the sheet is folded diptychally, a stiff perforate sheet 21, such as an expanded metal facing or the like, having large open areas and a size substantially identical to that of the back panel 17, is placed and fastened in such position inside the back panel 17 that when the filter unit is completed, the said expanded metal forms a facing for one side of the filter unit.

The perforate sheet 21 may be fastened by means of a cementitious material, staples or the like. A bat or mat of filter material 19 may now be placed in position to overlie the perforate sheet 21. The front panel 16 is folded diptychally thereover and corresponding marginal portions 13 are made to overlie each other and form the sides 23. The filter unit is now ready for storage, packing or shipping.

In order to help reenforce the filter unit, particularly when the original sheet of paper is of a flexible nature, stiffening strips 22 are preferably provided as lining for the side members 23. These may be made of a stiff cardboard, metal, wood or the like and may be held by a suitable cementitious substance. When the sheet is folded to form the envelope, the said stiffening strips 22 are in position to reenforce the margins of the envelope and to provide a framework upon which the perforate sheet 21 may find adequate support when considerable gaseous pressure is applied to the filter unit. It may be desirable to form the stiffening strips 22 integrally with the perforated sheet 21, or fasten it thereto by suitable means.

Although considerable time may have to elapse before the filter unit is to be installed, during which time much dust and dirt may come in contact with the filter unit, and, although the filtering material 19 may have dispersed therethrough an unctuous or wetting medium which stops and clings to dust particles coming in contact with the filtering material 19, nevertheless, the panels 16 and 17 serve to cover and protect the filtering medium from dust, dirt and surrounding atmosphere until it is ready to be installed. When it is desired to install the filter unit, the two faces of the panels 16 and 17, respectively, are removed by tearing along the scored or weakened lines 18, thereby exposing the filter medium for the first time and permitting the passage of air therethrough. To facilitate the tearing off and removal of the said two faces, the panel tabs 20 provide a place of beginning. After the faces of the panels 16 and 17 have been removed, installation into a conventional filter frame 25, as shown in Fig. 2, is easily accomplished.

In providing the filter medium 19, it is desirable to grade the material from front to back so that the intake side of the filter unit is provided with the coarsest filtering material 26 and the outlet side of the filtering unit is provided with the finest material 27. In this manner the heaviest or bulkiest particles of foreign matter in the air, such as lint and the like, may be halted in their path at the front inlet side of the filter unit where the interstitial spaces are large, so that the rear portions, having small interstitial spaces for the filtering air, may be made available to halt the finer foreign particles. Thus, longer life and more efficient filtering is imparted to the filter unit and less pressure is developed by the gas passing through the filter as the filter unit becomes filled with dirt since the dirt is evenly distributed from front to back.

In view of the fact that the front inlet side of the filtering unit has the coarsest and consequently a stiff filtering medium 26, and in view of the fact that this side is held in by the pressure of the incoming air, a reinforcing facing such as the perforate sheet 21 is generally unnecessary on this side. Of course, if weak or flexible filtering mediums are used, it is possible and within the contemplation of the present invention to incorporate a perforate sheet similar to the expanded metal sheet 21 overlying the filtering medium 26 to hold the same in place.

As a modification, Fig. 5 discloses an envelope 30, similar in design and structure to the sheet disclosed in Fig. 3 but in which the filtering medium 19 may be inserted in the envelope after the latter has been folded. The remaining sides 31 and the tabs 14 are folded down over the edge of the filtering material 19 and then fastened into place by suitable means. Stiffening means 22, as shown in Fig. 4, may also be incorporated.

Although the present invention has been illustrated and described in connection with specific embodiments, it is to be understood that variations and modifications may be resorted to and are within the contemplation of the present invention as defined in the appended claims.

I claim:

1. In combination with a filtering medium having a filter adhesive coating over said medium adapted to arrest particles impinging thereon, an envelope for said filtering medium, said envelope formed of a single sheet, the said sheet having score lines extending around the sheet in proximity to the margins and having two parallel score lines extending transversely of the sheet midway between its ends to provide front and back panels for the envelope and to form marginal sides for the envelope when the said margins are folded over, the said sheet being folded diptychally about the portion of sheet lying between said parallel score lines, said panels having perforate lines parallel with and a short distance inward from the outer edge of the panels to facilitate removal of the enclosed portion of panel and to provide openings for the passage of gases through the envelope when said enclosed portion is removed, and stiffening members attached to the said sides of the envelope adapted to reenforce the envelope.

2. In combination with a filtering medium having a filter adhesive coating over said medium adapted to arrest particles impinging thereon, an envelope for said filtering medium, said envelope formed of a single sheet, the said sheet having score lines extending around the sheet in proximity to the margins and having two parallel score lines extending transversely of the sheet midway between its ends to provide front and back panels for the envelope and to form marginal sides for the envelope when the said margins are folded over, the said sheet being folded diptychally about the portion of sheet lying between said parallel score lines, said panels having perforate lines parallel with and a short distance inward from the outer edge of the panels to facilitate removal of the enclosed portion of panel and to provide openings for the passage of gases through the envelope when said enclosed portion is removed, stiffening members attached to the said sides of the envelope adapted to reenforce the envelope, and a perforate sheet underlying one of said panels and covering the said opening therethrough.

3. A filter unit comprising an envelope for filter units formed of a single sheet, the said sheet having score lines extending around the sheet in proximity to the margins and having two parallel score lines extending transversely of the sheet midway between its ends to provide front and back panels for the envelope and to form marginal sides for the envelope when the said margins are folded over, the said sheet being folded diptychally about the portion of sheet lying between said parallel score lines, said panels having perforate lines parallel with and a short distance inward from the outer edge of the panels to facilitate removal of the enclosed portion of panel and to provide openings for the passage of gases through the envelope when said enclosed portion is removed, stiffening members attached to the said sides of the envelope adapted to reenforce the envelope, a perforate sheet underlying one of said panels and covering the said opening therethrough, and a filtering medium incorporated within said envelope, the said medium being graded in fineness from one of said openings to the other, the finest material being adjacent to the said perforate sheet.

4. As an article of manufacture, a combined filter unit and enclosing envelope, said filter unit including a rectangular body of matted fibers and a viscous substance coating said fibers, an envelope enclosing said body, said envelope formed from a single piece of sheet material having score lines along which the sheet is folded into the form of a rectangular container to fit and enclose the filter body, the major faces of the envelope being formed with rows of perforations extending parallel with and adjacent the edges of said faces to form removable panels, whereby when said panels are removed the major portions of the opposite faces of the filter body are exposed.

FRANK L. MYERS.